Patented Oct. 24, 1939

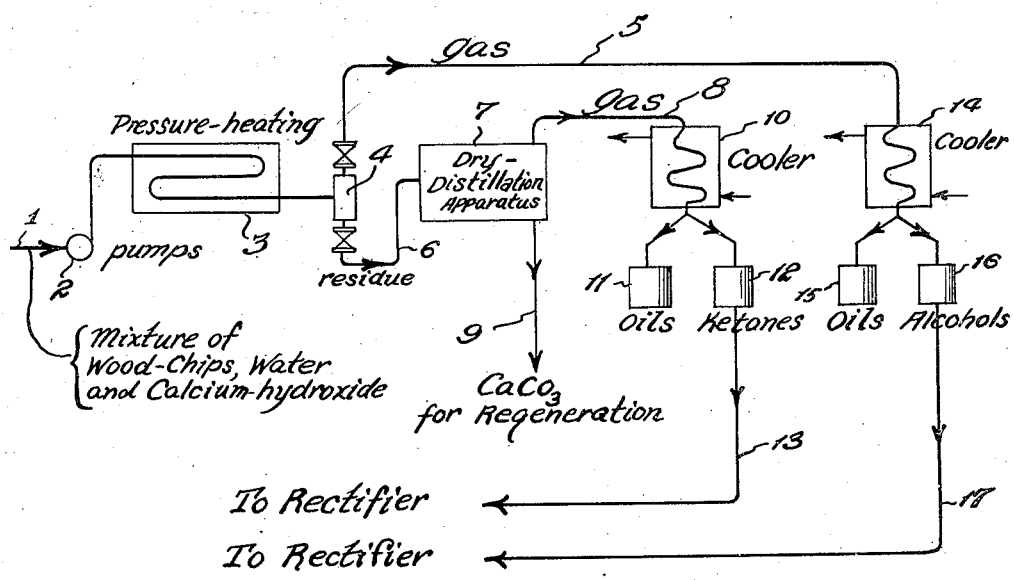

2,177,557

UNITED STATES PATENT OFFICE 2,177,557

METHOD OF TREATING WOOD OR LIGNINE OR CELLULOSE CONTAINING MATERIALS FOR OBTAINING VALUABLE PRODUCTS

Hilding Olof Vidar Bergstrom, Stocksund, near Stockholm, and Karl Nicolaus Cederquist, Stockholm, Sweden Application February 24, 1937, Serial No. 127,570
In Sweden December 12, 1931

3 Claims. (Cl. 202—5)

Our present invention has for its object a method of treating wood or woody materials, such as peat and peat-moss in order to obtain valuable products. This application is a continuation-in-part of U. S. application Serial No. 646,026.

It has been found that if wood or woody materials are heated or digested with water and oxides, hydroxides or carbonates of calcium, iron, zinc, magnesium or aluminium, which are insoluble or sparingly soluble in water at temperatures above 220° C. and under a pressure corresponding to or higher than the pressure of saturated steam at the temperature used, the wood will be transformed into compounds of less complicated chemical structure. The transformation takes place under formation of volatile products, principally oils and alcohols, and non-volatile metallic compounds principally consisting of water-soluble and insoluble salts of organic acids, and without formation of carbon.

Consequently the process is not a carbonization since the reactions take place without the formation of carbon.

The volatile products formed during the pressure heating consist of oils and water-soluble alcohols, e. g. methanol, ethanol and propanols.

The organic metallic compounds formed may be decomposed by destructive distillation and under such conditions yield volatile water-soluble products, principally consisting of ketones, e. g acetone and methyl-ethylketone and oils.

As an example of yields which may be obtained according to this invention which consists in pressure-heating under the conditions mentioned above and destructive distillation of the salts of organic acids formed, it may be indicated that if calcium hydroxide is used as "digesting" agent certain wood has yielded 21.6% oils and 15.4% of water-soluble products or together 37% calculated on dry wood. The pressure-heating and the destructive distillation are carried out in two different stages.

In order to change the conditions of the reactions during the pressure-heating it is suitable to add to the reacting materials, substances acting as catalyzers, such as organic salts, for instance formiates, or inorganic salts of the metals present in the reacting mixture. By this means it will be possible to change the ratio between the outputs of water soluble products and oils.

The pressure-heating can be carried out in an autoclave or other suitable pressure-heating systems. The destructive distillation of the salts may be done in an autoclave, shaft furnace or rotary oven. The pressure-heating stage as well as the destructive distillation stage are advantageously carried out continuously, but can of course also be done periodically.

If the pressure-heating is carried out continuously and wood is used as starting material the same must be brought to a divided condition, such as wood chips or sawdust to be fed directly into the pressure-heating system. For transforming the wood into subdivided condition it may be heated to a temperature of 140°–220° C., whereby a partial hydrolysis takes place. Thereafter the wood is ground, the heating then facilitating the grinding. This preliminary heating of the wood may be carried out by passing steam through the same. Before or after the grinding operation the steam heated wood is mixed with hydroxides, oxides or carbonates sparingly soluble in water and so much of water that the decomposition during the following pressure-heating takes place in the presence of liquid water, so as to avoid the carbonization of the wood.

The invention is made clear in the following description of a practical example in which wood is used as starting material and calcium hydroxide as digesting agent.

Finely divided wood, calciumhydroxide and water are fed into an autoclave or any other suitable pressure-heating system, after having been preheated in the above mentioned manner.

The autoclave is heated to temperatures above 220° C., suitably 220° to 360° C. The pressure in the autoclave will then be higher than that of saturated steam at the temperature used.

The feeding of the materials into the autoclave is suitably carried out continuously, and the resulting products are continuously discharged into a receiver.

From the receiver or from other parts of the pressure heating system vapors are drawn off. Said vapors are condensed, whereby a condensate is obtained. This condensate consists of oils and an aqueous solution, the latter containing principally alcohols, such as methanol, ethanol and propanols, which may be recovered from the aqueous solution. The latent heat of said vapors may be utilized, for instance for the distillation of liquid products obtained in the process, for pre-heating the mixture of starting materials introduced into the autoclave or for other purposes.

The metallic compounds, which are formed during the pressure-heating consist as mentioned above of soluble and insoluble salts and are discharged from the pressure-heating system together with an aqueous solution. The aqueous solution may be separated from the solids and brought back into the process, for instance by being mixed with the starting materials or for the preparation of caustic lime.

The remaining metallic compounds or the entire discharged materials from the pressure heating system are dried and decomposed by destructive distillation. The residue after the destructive distillation contains calcium carbonate, from which calcium oxide, CaO, is recovered by burning in kilns. It may be suitable to form the metallic compounds into briquettes before the destructive distillation or the recovering of calcium oxide.

The heat may suitably be supplied to the material exposed to the destructive distillation by means of circulating hot vapors. During this process it is necessary to introduce steam or indifferent gases at any convenient place of the gas circulation. The excess of vapors is drawn off and cooled. From the condensed vapors oils and an aqueous solution are obtained, the latter containing principally ketones, such as acetone and methyl-ethyl-ketone.

The quantity of lime to be added to the starting material can be varied within wide limits, depending on the nature of the raw material. In case of wood good results are obtained by adding CaO in a quantity of about 60% of the weight of the wood, but even smaller amounts can advantageously be used. As an example of such smaller quantities it may be indicated, that by using 29% of Ca(OH)$_2$ a yield of about 30% of oils and water-soluble products was obtained. All figures are calculated on the weight of the dry wood. Still lower quantities of lime have been used and given satisfactory yields of volatile products.

If the pressure-heating is carried out at lower temperatures, e. g. 220 to 275° C., within the interval of 220° to 360° C. smaller quantities of volatile products are formed during the pressure heating, and greater quantities of products are obtained when the metallic compounds are decomposed by destructive distillation and vice versa. A change of the temperature during the pressure-heating will cause a change of the yield of water soluble products both with regard to quality and quantity.

As stated above the calcium hydroxide used in the present example may be replaced by oxides, hydroxides and carbonates of Ca, Mg, Al, Zn, etc. and the term calcium compounds sparingly soluble in water should be understood as being equivalent to oxides, hydroxides or carbonates of the above mentioned metals.

Also since as above stated the invention is available for different woody material besides wood, the term wood or woody material should, therefore, be understood as being equivalent to peat, peatmoss, etc.

The above described method can be varied in several ways without departing from the object of the invention.

The above described process may be carried out in the apparatus schematically illustrated in the accompanying drawing, wherein 1 designates a conduit through which a mixture of wood-chips, water and calcium hydroxide is fed by a pump 2 into a pressure-heater (autoclave) 3. From there the decomposed mass and solid residue is introduced into a receiver 4. From this receiver gas escapes through the conduit 5, while the residue is through conduit 6 introduced into the dry-distillation apparatus 7. The gas from the conduit 5 is led through a cooler 14, where a condensate is formed consisting of a solution of alcohols and collected in the vessel 16, from which it is led to a rectifier through conduit 17. The oil is collected in vessel 15.

From the dry-distillation apparatus 7 the gas escapes by conduit 8 and is led through a cooler 10. The condensate, containing ketones, is collected in vessel 12 and is led through conduit 13 to another rectifier than that connected with conduit 17. The oils are collected in vessel 11 and carried over therefrom for further treatment.

Through conduit 9 the solid residue from the dry distillation is removed from the dry-distillation apparatus 7 and is then regenerated for forming calcium hydroxide to be used in the process.

We claim:

1. Method of transforming woody material into alcohols, ketones, oils and salts of organic acids comprising heating the woody material together with sufficient added water to prevent carbonization and calcium hydroxide under a pressure higher than that of saturated steam in an autoclave to a temperature between 220° C. and 360° C. by means of steam introduced into the same, so as to decompose substantially all of the woody material, the amount of calcium hydroxide being sufficient to chemically react with the products formed by the pressure heating of the woody material to form calcium salts, withdrawing volatile substances from the autoclave and condensing the same, separating oily products from the aqueous solution of the condensate thereby obtained, recovering alcohols from said solution, exposing the solid residue consisting principally of calcium salts from the autoclave in a separate operation to dry destructive distillation at such a temperature to form ketones from the calcium salts, condensing the escaping distillation gases and separating the oily products from the aqueous solution, recovering ketones from said solution and recovering from the distillation residue metallic oxides to be used for the treatment of fresh raw materials.

2. Method of transforming woody material into alcohols, ketones, oils and salts of organic acids comprising heating the material to a temperature between 120° C., and 220° C., grinding the material into a powder, mixing the powder with water and calcium hydroxide, feeding the mixture into an autoclave and heating the mixture to a temperature between 220° C. and 360° C. while under pressure to decompose substantially all of the material, the amount of water being sufficient to prevent carbonization and the amount of calcium hydroxide being sufficient to react with the products formed by the pressure heating of the woody material, condensing the volatile products formed in the autoclave to obtain oils and alcohols, discharging the solid and liquid residue from the autoclave, separating the solid residue therefrom and forming briquettes thereof, drying said briquettes and then subjecting them to dry destructive distillation at such a temperature to form ketones, condensing the escaping distillation gases and separating the oily products from the aqueous solution, recovering ketones from said solution and recovering from the distillation residue metallic oxides to be used for the treatment of fresh raw materials.

3. Method according to claim 2, wherein calcium formiate is added to the mixture as a catalyst.

HILDING OLOF VIDAR BERGSTROM.
KARL NICOLAUS CEDERQUIST.